US010323625B1

(12) United States Patent
Armstrong (10) Patent No.: US 10,323,625 B1
(45) Date of Patent: Jun. 18, 2019

(54) LOW DISSIPATION ELASTIC PISTON SYSTEM FOR ENERGY CONVERSION AND SOLAR ENERGY GENERATION

(71) Applicant: U.S. Department of Energy, Washington, DC (US)

(72) Inventor: Michael Robert Armstrong, Livermore, CA (US)

(73) Assignee: U.S. Department of Energy, Washington, DC (US)

( * ) Notice: Subject to any disclaimer, the term of this patent is extended or adjusted under 35 U.S.C. 154(b) by 80 days.

(21) Appl. No.: 15/713,752

(22) Filed: Sep. 25, 2017

Related U.S. Application Data

(60) Provisional application No. 62/398,622, filed on Sep. 23, 2016.

(51) Int. Cl.
*F03G 6/06* (2006.01)
*G02F 1/01* (2006.01)
*G02B 27/28* (2006.01)

(52) U.S. Cl.
CPC ............ *F03G 6/06* (2013.01); *G02B 27/283* (2013.01); *G02F 1/0136* (2013.01); *F03G 2006/062* (2013.01)

(58) Field of Classification Search
CPC ... F03G 6/00; F03G 6/001; F03G 6/06; F03G 6/068; F03G 2006/062; G02B 27/283; G02F 1/0136
See application file for complete search history.

(56) References Cited

U.S. PATENT DOCUMENTS

| 4,452,047 A * | 6/1984 | Hunt | F02G 1/0435 60/641.15 |
| 5,089,055 A * | 2/1992 | Nakamura | B64G 1/443 136/248 |
| 2009/0134748 A1 * | 5/2009 | Penciu | F03G 6/06 310/339 |
| 2009/0159078 A1 * | 6/2009 | Penciu | F03G 6/00 126/704 |
| 2014/0020385 A1 * | 1/2014 | Petkanchin | F03G 6/06 60/641.15 |

\* cited by examiner

*Primary Examiner* — Mark A Laurenzi
*Assistant Examiner* — Xiaoting Hu
(74) *Attorney, Agent, or Firm* — Wendell A. Peete; Brian J. Lally (57) ABSTRACT

The present invention comprise an elastic piston system for the conversion of solar energy to electrical energy, the system comprising a solar energy concentrator 202, and at least two solar energy conversion cells 200 being configured to receive the sunlight 204 reflected from the solar energy concentrator 202. The solar energy conversion cell 200 comprises at least two elastic piston 302, 304 components. The elastic pistons 302, 304 being coupled via a conduit 314, 416 for the transmittal of a predetermined working fluid 418. The elastic pistons 302, 304 are configured to receive polarized sunlight and generate electrical energy in response to the reception of the polarized sunlight, The solar energy conversion cell further comprises a controller 306 component, The controller 306 being configured to regulate the compression cycles within the elastic piston 302, 304 components and extract electrical energy produced within the cell 200.

17 Claims, 4 Drawing Sheets

LOW DISSIPATION ELASTIC PISTON SYSTEM FOR ENERGY CONVERSION AND SOLAR ENERGY GENERATION

BACKGROUND OF THE INVENTION

Field of the Invention

This invention relates to low dissipation heat engine-based elastic piston solar energy conversion systems.

Description of the Background

Heat engines are designed to derive mechanical work from a thermal gradient by using a mechanical piston to periodically compress and decompress a working fluid while simultaneously transferring heat into and out of the working fluid in synchronization with the travel path cycle of the piston. The transfer of heat into and out of the working fluid is accomplished via the utilization of hot and cold fluid reservoirs that are used to transfer and absorb heat within the heat engine system.

Figure 1A:
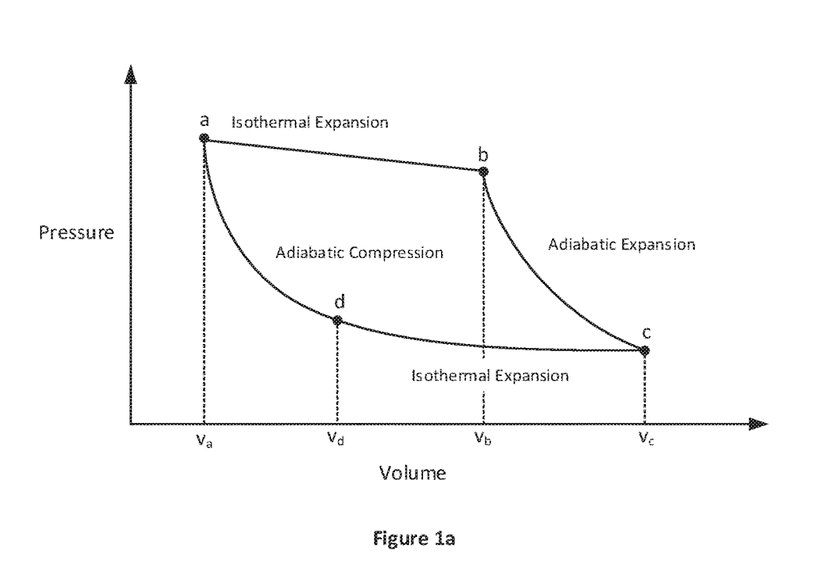
FIG. 1a illustrates the thermodynamic path of the working fluid in a Carnot cycle.
Figure 1B:
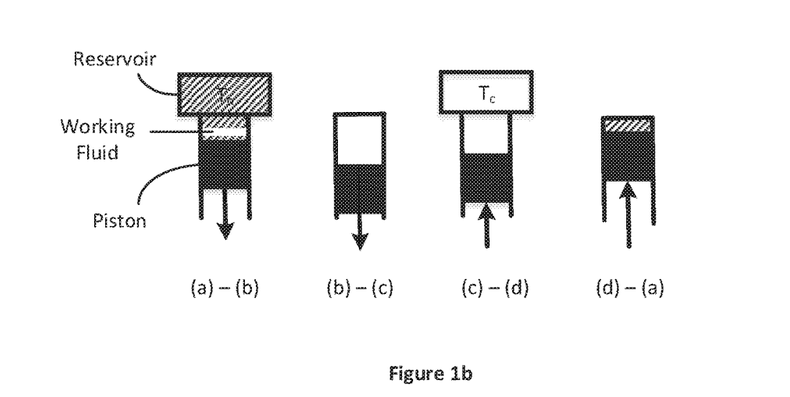

An ideal example of a type of thermodynamic cycle—the Carnot cycle—that can be implemented within a heat engine is illustrated in FIGS. 1a and 1b. FIG. 1a shows the thermodynamic path of the working fluid in the Carnot cycle in respect to pressure and volume within a system. FIG. 1b details the piston positions that correspond with four cyclic segments as labeled along the thermodynamic path shown in FIG. 1a.

The physical isothermal expansion of a working fluid is illustrated in FIG. 1b and corresponds with the graph of the thermodynamic cycle beginning point (a) in FIG. 1a. During isothermal expansion the working fluid extracts heat from a heat reservoir (points (a)-(b) of FIG. 1b). This thermal expansion is followed by an adiabatic expansion phase, which begins at point (b) and concludes at point (c) of FIG. 1b (points (b)-(c) of FIG. 1b).

Next, isothermal compression of the working fluid at low pressure is initiated at point (c) of FIG. 1a. During this phase of the Carnot cycle heat is deposited into a cold reservoir (points (c)-(d) of FIG. 1b). Finally, what follows is an adiabatic compression phase (points (d)-(a) of FIG. 1b) which returns the working fluid to the beginning of the cycle.

The Carnot cycle achieves the maximum conversion efficiency that is possible for an ideal heat engine. The efficiency of the Carnot cycle is represented by the equation $$1 - \frac{T_C}{T_H},$$

where $T_C$ is the temperature of a cold reservoir and TH is the temperature of a hot reservoir within a system. The amount of mechanical work that is extracted from the exemplary system is equal to $$1 - \frac{T_C}{T_H}$$

multiplied times the heat extracted from the hot reservoir. In practice it is not possible to achieve this optimal efficiency within a given heat engine system due to the varying dissipative effects that are to be found within a system (e.g.,effects due to friction) that irreversibly convert mechanical work into unrecoverable heat and therefore will reduce the efficiency of a heat engine system.

In operation, conventional heat engines convert energy that has been extracted from a thermal gradient to mechanical energy; in most cases this extracted mechanical energy is further converted to electrical energy. Mechanical energy can most easily be converted to electrical energy by employing an electrical generator in conjunction with a heat engine system. However, the introduction of additional energy conversion components within a system also introduces further systemic inefficiencies into the conversion of thermal energy to electrical energy by the increase of heat dissipation that will be required within the system due to the newly introduced electrical energy conversion components.

SUMMARY OF THE INVENTION

The shortcomings of the prior art are overcome and additional advantages are provided through the provision of an elastic piston system for the conversion of solar energy to electrical energy, the system comprising a solar energy concentrator 202, the solar energy concentrator 202 being adapted to receive sunlight 204 and concentrate the reflected sunlight 204 at a focal point, and at least two solar energy conversion cells 200 being configured to receive the sunlight 204 reflected from the solar energy concentrator 202.

A respective solar energy conversion cell 200 comprises a modulating component 300 configured for the reception of sunlight 204, the light modulating component 300 comprises an optical window 308 through which sunlight 204 will be transmitted, a polarization modulator 310 for the reception and modulation of the sunlight 204 that has been transmitted through the optical window 308 and a polarization beam splitter 312, the polarization beam splitter 312 being configured receive light transmitted from the polarization modulator 310 and thereafter modulate the intensity of the sunlight 204 that will be transmitted to a respective predetermined destination.

A solar energy conversion cell 200 further comprises at least two elastic piston 302, 304 components. The elastic pistons 302, 304 are coupled via a conduit 314, 416 for the transmittal of a predetermined working fluid 418. The elastic pistons 302, 304 are also configured to receive polarized sunlight and generate electrical energy in response to the reception of the polarized sunlight, the polarized sunlight being transmitted from the polarization beam splitter 312 to the elastic piston 302, 304 components.

The solar energy conversion cell 200 yet further comprises a controller 306 component, the controller 306 component being in electrical communication with the components of the light modulating component 300, including the polarization modulator 310 and the polarization beam splitter 312, and the respective elastic piston 302, 304 components.

The controller 306 is further configured to regulate the compression cycles within the elastic piston 302, 304 components, extract electrical energy produced within the cell 200, and regulate and distribute the polarized sunlight from the polarizing beam splitter 312 to the elastic piston 302, 304 components.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 1b illustrates piston positions within a heat engine that correspond with the Carnot cycle shown in FIG. 1a.

The detailed description explains the preferred embodiments of the invention, together with advantages and features, by way of example with reference to the drawings.

DETAILED DESCRIPTION OF THE INVENTION

One or more exemplary embodiments of the invention are described below in detail. The disclosed embodiments are intended to be illustrative only since numerous modifications and variations therein will be apparent to those of ordinary skill in the art. In reference to the drawings, like numbers will indicate like parts continuously throughout the views. Herein, the use of the terms first, second, etc., do not denote any order or importance, but rather the terms first, second, etc., are used to distinguish one element from another. Furthermore, the use of the terms a, an, etc., do not denote a limitation of quantity, but rather denote the presence of at least one of a referenced item.

We will describe herein exemplary embodiments of a heat engine for the conversion of solar thermal energy into electricity. To increase the efficiency of the conversion of thermal energy to any other form of energy the losses incurred by the dissipation of heat within a system must be lowered. In the instance that a heat engine is utilized to convert thermal energy to electrical energy the efficiency is increased and the complexity is decreased within such a system in the event that the system does not utilize an intermediate mechanical energy conversion step.

Within alternative embodiments of the present invention a heat engine may be utilized to derive electrical energy from any suitable thermal gradient or a gradient that comprises a related thermodynamic property (e.g., pressure). Suitable thermal gradients for an energy conversion system could be derived from, but not exclusively, the following: geothermal energy sources; chemical energy sources; and a pressure gradient between two vertical positions under the influence of gravity (e.g., the gravitational influence between the surface of the ocean and a predetermined distance below the surface).

In additional alternative embodiments of the present invention a heat engine may be configured to function as an inverse heat engine for the conversion of electrical energy to a thermal gradient (i.e., a heat pump) or as a converter of electrical energy to a related thermodynamic property (e.g., pressure).

Presently, commercial photovoltaic solar cells typically achieve less than 20% energy conversion efficiency and silicon based photovoltaic solar cells are fundamentally limited to 29% energy conversion efficiency. A heat engine deriving heat from a solar concentrator (i.e. a focusing parabolic mirror) can be used to generate mechanical energy and electricity via an electric generator. Theoretically, a heat engine using a solar concentrator has the potential to obtain high efficiencies since solar concentrators can obtain temperatures several times that of ambient temperatures (i.e., greater than 1000 degree C.), thus implying a potential theoretical maximum efficiency greater than that of 50%.

Because of dissipation in the mechanism of heat engine-based solar cells, thermal engine based solar collectors only achieve 31% efficiency, are expensive, and have high maintenance costs relative to photovoltaic solar cells (which are solid state). Therefore, within this field of technology a heat engine that has low dissipation (and thus higher efficiency) and does not require a separate electrical generator would be most desirable.

Exemplary embodiments of the present invention can be configured to reduce the dissipation of thermal energy introduced to the pistons of a heat engine (see FIGS. 1b and 2) via a solar concentrator, thus increasing the efficiency of the conversion of solar energy to electrical energy without the use a separate electrical generator. Additional exemplary embodiments of the present invention reduce the dissipation within a heat engine by keeping all compression in the heat engine cycle either elastic (in the case of pistons constructed from solids) or as near as possible to adiabatic or isothermal (in the case of the working fluid). Dissipation is further reduced by extracting electrical energy from the system directly via the piezoelectric effect (or other effects which couple material deformation to electro-magnetic fields) rather than by a separate electrical generator. And yet further, dissipation is reduced by the utilization of a high-pressure working fluid to accommodate the flow of high power.

Figure 2:
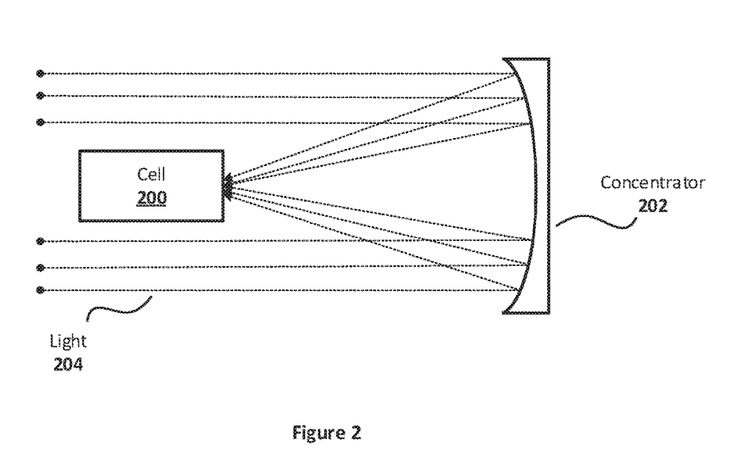
FIG. 2 illustrates a solar energy conversion system as described within embodiments of the present invention.
Figure 3:
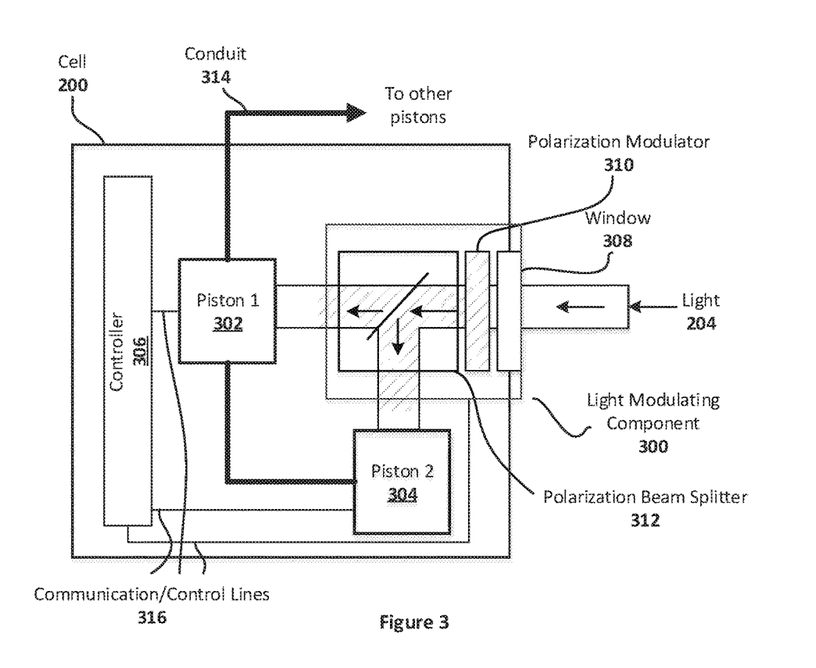
FIG. 3 illustrates an electrical energy generating cell as described within embodiments of the present invention.

FIGS. 2 and 3 illustrate that the components of the exemplary embodiments of the present invention are similar to that of a conventional heat engine. In the illustrative embodiment of FIG. 3 an elastic piston 302, 304 mechanism is shown. Depending on the configuration needs of the heat engine systems, differing exemplary embodiments of the present invention can be configured to utilize pistons 302, 304 made from predetermined piezoelectric materials. The pistons 302, 304 are configured to alternately quasi-adiabatically heat and cool, and quasi-isothermally compress and decompress a working fluid (as shown in FIG. 1b and in accord with the graph of FIG. 1a).

Within in a conventional engine the work with the system would be extracted via a shaft connecting a piston to an external mechanism (such as a generator) while transmitting waste heat (i.e. energy that cannot be recovered as work) from a "hot" reservoir to a "cold" reservoir. Within the exemplary embodiments of the present invention the overall efficiency of the heat engine is increased and the dissipation within the system is lowered by the removal of the thermal-to-mechanical energy step that is required of conventional heat engine systems.

Similar to conventional Stirling engine-based solar energy cells, in the exemplary systems described herein energy (i.e., concentrated light from the sun) alternately heats (via heat from absorbed sunlight) and cools (via, in one exemplary embodiment, thermal conduction) thermal reservoirs that are coupled to a working fluid which acts upon the pistons 302, 304 to extract work. Waste heat within a system may be extracted with external pistons coupled to a cold reservoir or via direct cooling.

Within exemplary embodiments of the present invention, in contrast to conventional heat engines, the pistons 302, 304 physically compress but do not push an external shaft to extract mechanical energy. As said above, the pistons 302, 304 can comprised of piezoelectric materials. The compression of a respective piezoelectric piston 302, 304 results in the generation of electrical energy (via the piezoelectric effect) that may be transmitted directly, via wires connecting the piezoelectric crystal piston 302, 304, to an external electrical circuit (not shown), or via electrical inductive or capacitive coupling to an external electrical circuit (not shown).

Also in contrast to conventional heat engines, energy within a system can be transmitted and stored in acoustic waves within the working fluid. Within a system the working fluid is contained in conduits 314 that are sealed to and connecting the pistons (which contain the working fluid). Within the exemplary embodiments of the present invention depending on the needs of a system the conduits 314 can either be configured as the physical regions or boundaries between independently modulated pistons 302, 304 of the same cell 200 or as a dedicated mechanical structure serving the same purpose. In one exemplary embodiment, the length of the conduit 314 is set to accommodate an acoustic wave at the stroke rate of the pistons 302, 304 or a predetermined harmonic of the stroke rate of the pistons 302, 304. The pistons being situated so that the acoustic waves in the conduit 314 have a constant phase shift with respect to the phase of the piston's 302, 304 stroke.

As shown in FIG. 3, the deposition of light energy in some pistons 302, 304 is regulated by a light modulator component 300, which can distribute light between pistons 302, 304, and control how that light is distributed between pistons 302, 304 as a function of time. The light modulator component 300 comprises a light modulator such as, but not limited to, a liquid crystal light modulator or an electro-optic light modulator (e.g., a Pockels cell), and can periodically modulate the transmission of light to a heat reservoir (not shown) at the stoke rate of the pistons 302, 304 or a harmonic of the stroke rate of the pistons 302, 304.

A controller 306 regulates the flow of electrical energy between an external load (not shown) that receives the energy extracted from the cell, the pistons 302, 304, and an acoustic wave via modulation of the impedance of electrical circuits that connect the piezoelectric crystal pistons 302, 304 to the external load. Therefore, in this exemplary embodiment the piezoelectric pistons 302 and 304, the acoustic waves between the pistons, a light modulating component 300 which modulates the flow of heat energy to heat reservoirs (not shown), and the controller 306 work in concert to extract energy from heat introduced to the system.

Figure 4A:
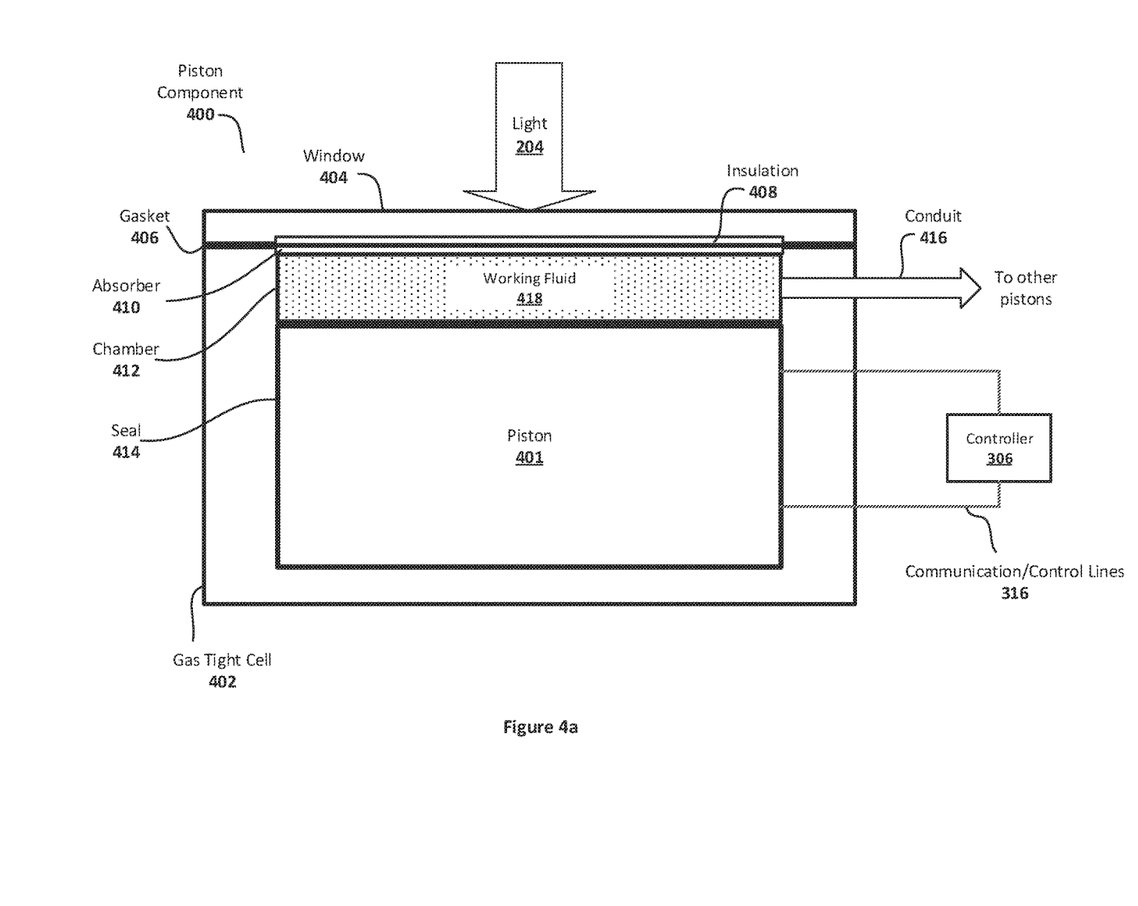
FIG. 4a illustrates a cross section diagram of a piston and its immediate enclosure as described within embodiments of the present invention.
Figure 4B:
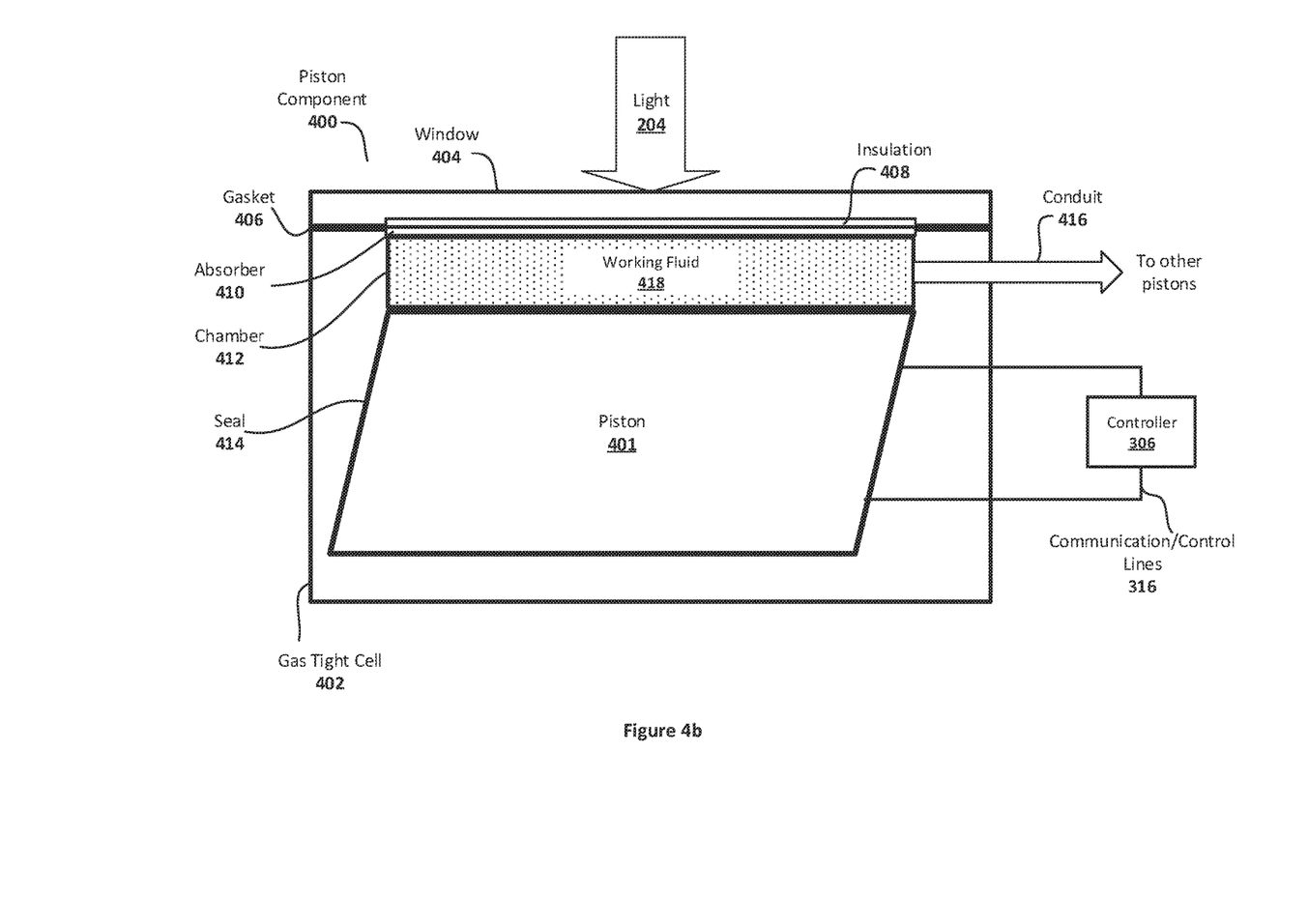
FIG. 4b illustrates a cross section of an alternate containment geometry of a piston and its immediate enclosure as described within embodiments of the present invention.

FIGS. 4a and 4b illustrate piston component 400 configurations that may be implemented within exemplary embodiments of the present invention. The pistons 401 of the components 400 are constructed of piezoelectric materials, and as such, the elastic deformation of the pistons 401 is converted to electrical energy via the piezoelectric effect. In further exemplary embodiments electrical or magnetic energy might be derived from the pistons 302, 304, 401 by other physical phenomena that couple electro-magnetism to the mechanical deformation of a piston 302, 304, 401 (e.g., such as in magnetostriction).

Hard materials such as piezoelectric crystals can only withstand elastic deformation at strains of less than 0.1%. Further, a piezoelectric piston of some predetermined cm thickness can only achieve a displacement of less than 10 microns, thus the volume of the working fluid at full displacement would be approximately 10 cm$^2$μm. At conventional pressures and stroke rates, such a small displacement volume would not be suitable to provide a sufficient amount of work to transmit power at a rate consistent with a high temperature, high power (e.g., 1000 C, 1000 W) reservoir. Yet, piezoelectric crystals can achieve stroke repetition rates well into kHz and withstand pressures into the kbar range. Static compression cells in large volume presses can achieve amounts greater than 10-kbar pressure over a cubic-centimeter volume. For a working fluid pressure of a predetermined kbar amount and a stroke rate in the kHz range power into the kW range can be transmitted even with approximately 10 cm$^2$μm displacement volume.

As shown in FIGS. 4a and 4b exemplary embodiments of the piston component 400 can include an absorption surface comprising a thermal insulation layer 408 and an absorption layer 410 between the working fluid chamber 412 and the piston component window 404. Alternative containment geometries for the pistons 401 such as that shown in FIG. 4b can additionally be implemented. Generally, in the case of a piezoelectric piston 401, the shape of the piston may be chosen to optimize the electric field resulting from pressure applied to the piston 401. The piston 400 component enclosure is sealed 414 in a manner similarly to that employed in conventional high-pressure technology where gaskets 406 seal gaps between pieces of the high-pressure enclosure 402 that is clamped together with an external framework.

In the exemplary embodiments of the present invention the compression and heating of the working fluid 418 does not generate substantial amount of dissipative energy. Further the working fluid 418 preferably comprises a nonreactive gas or a supercritical fluid at a high temperature and pressure (e.g., a substance at 2 kbar pressure and greater than 1000 degrees C.). A chemically reactive working fluid 418 at a high pressure and temperature may corrode parts of the system and ultimately degrade performance. This aspect may be avoided via the use of noble gases as the working fluid since these are substantially unreactive, even at high temperature and pressure. Argon or other noble gases would be good examples of working fluids 418 that could be implemented within embodiments of the present invention.

Dissipative energy with a system may be generated within the working fluid 418 via the initiation of the turbulent flow of the working fluid 418 or by the formation of shock waves in conduits 314, 416 between the pistons 302, 304, 401. The effects of turbulent flow or shock waves within a conduit 314, 416 may be mitigated by transmitting pressure via acoustic waves (with low net flow) throughout a conduit 314, 416 in addition to reducing the length of a conduit 314, 416 in order to limit the propagation distance of pressure waves within the conduit 314, 416.

As mentioned above, within in a conventional engine the work with the system would be extracted via a shaft connecting a piston to an external mechanism (such as a generator) while transmitting waste heat (i.e. energy that cannot be recovered as work) from a "hot" reservoir to a "cold" reservoir. Within the exemplary embodiments of the present invention the overall efficiency of the heat engine is increased and the dissipation within the system lowered by the removal of the thermal-to-mechanical energy step that is required of conventional heat engine systems.

Exemplary embodiments of the present invention can be structurally configured to situate "hot" and "cold" reservoirs directly next to each other. In this instance the conduit 314, 416 would comprise the region or boundary between two portions of the same cell 200 between the independently modulated pistons 302, 304. In further exemplary embodiments the cell 200 itself could be structurally configured to serve as both a "hot" and "cold" reservoir, thus eliminating the need for an internal conduit 314, 416 within the cell. In this instance the cell 200 would be "hot" when the cell 200 is exposed to sunlight 204, and "cold" when it is not exposed to sunlight 204. In this instance the controller 306 can be configured to calculate the thermal diffusion times for each piston 302, 304 in addition to the duty cycles for the "hot" and "cold" segments of the energy production cycle. For this exemplary embodiment the "hot" interval of the cycle would have to be shorter than the "cold" interval of the cycle in order to aid in the dissipation of heat from the system between the "hot" and "cold" intervals.

A further exemplary embodiment of the present invention comprises an elastic piston system for the conversion of solar energy to electrical energy, wherein the system comprises a solar energy concentrator 202 and at least two solar energy conversion cells 200. The solar energy concentrator 202 is adapted to receive sunlight 204 and concentrate the reflected sunlight 204 at a focal point at the cell 200. The solar energy conversion cells 200 of the system are configured to receive the sunlight 204 reflected from the solar energy concentrator 202.

A respective solar energy conversion cell 200 comprises a light modulating component 300 that is configured for the reception of sunlight and at least two elastic piston 302, 304 components for the generation of electrical energy within the system. The elastic pistons 302, 304 are coupled via a conduit 314, 416 for the transmittal of a predetermined working fluid 418, The light modulating component 300 comprises an optical window 308 through which sunlight 204 is transmitted, a polarization modulator 310 for the reception and modulation of the sunlight 204 that has been transmitted through the optical window 308, and a polarization beam splitter 312, the polarization beam splitter 312 being configured receive light transmitted from the polarization modulator 310 and thereafter modulate the intensity of the light that will be transmitted to a respective destination.

The solar energy conversion cell 200 also comprises elastic pistons 302, 304 that are configured to receive polarized sunlight and generate electrical energy in response to the reception of the polarized sunlight, the polarized sunlight being transmitted from the polarization beam splitter 312 to the elastic piston 302, 304 components. A controller 306 component is also comprised, wherein the controller 306 component is in electrical communication with the polarization modulator 310 and the respective elastic piston 302, 304 components. The controller 306 is configured to regulate compression cycles within the elastic piston 302, 304 components, extract electrical energy produced within the cell 200, and regulate and distribute the polarized sunlight from the polarization beam splitter 312 to the elastic piston 302, 304 components.

Within further exemplary embodiments of the present invention the light 204 collected at the concentrator 202 is focused and transmitted to the optical window 308 of the solar energy conversion cell 200. Thereafter the light 204 transmitted to the optical window 308 travels through the optical window 308 and arrives at the polarization modulator 310 where thereafter the unpolarized light is transformed into polarized light. The polarized light leaves the polarization modulator 310 and arrives at the polarization beam splitter component 312, the polarization beam splitting component 312 being configured to modulate the intensity of the polarized light prior to transmitting the polarized light to at least one predetermined elastic piston 302, 304.

In yet further exemplary embodiments of the present invention the controller 306 is configured to establish a level of polarization for the polarized light that is filtered by the polarization modulator 310 and thereafter configure the polarization modulator 310 to filter received light at this established level of polarization. The controller 306 is also configured to regulate the compression cycles of the elastic pistons 302, 304.

Additionally, the controller 306 is configured to control the transmission and distribution of the polarized light received at the polarization beam splitter 312 to a predetermined elastic piston 302, 304 in order to regulate the transfer of heat to the respective elastic pistons 302, 304 situated within a solar energy conversion cell 200 from the polarized light transmitted by the polarized beam splitter 312. The controller 306 is also configured to regulate the extraction and delivery of electrical energy produced at the solar energy conversion cell 200 in which the controller 306 is situated to a predetermined external location.

The controller 306 can also be configured to determine and regulate compression cycles for the elastic pistons 302, 304 in order to generate acoustic waves within the working fluid 420. In exemplary embodiments of the present invention the controllers 306 from differing solar energy conversion cells 200 are in electrical communication with one another and work in concert to regulate the transfer of heat and the extraction of electrical energy from their respective solar energy conversion cell 200 to predetermined external locations.

Further, since the controller 306 accesses the light intensity modulation and piston 302, 304 compression cycles electrically (rather than mechanically), it is possible to control the form of the piston 302, 304 compression profile and modulator 300 intensity profile with more freedom than found in a mechanical piston. This control can be used to actively optimize the efficiency of the cell 200 by modulating compression and modulation profiles. The efficiency of the cell 200 can be optimized as a function of operating conditions, e.g. the intensity of sunlight 204.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims.

What is claimed:

1. An elastic piston system for the conversion of solar energy to electrical energy, the system comprising:
   a solar energy concentrator, the solar energy concentrator being adapted to receive and reflect sunlight and concentrate the reflected sunlight at a focal point;

at least two solar energy conversion cells being configured to receive the sunlight reflected from the solar energy concentrator, wherein a respective solar energy conversion cell comprises:
- a light modulating component configured for the reception of sunlight, the light modulating component comprising:
  - an optical window through which sunlight will be transmitted;
  - a polarization modulator for the reception and modulation of the sunlight that has been transmitted through the optical window; and
  - a polarizing beam splitter, the polarizing beam splitter being configured to receive light transmitted from the polarization modulator and thereafter modulate the intensity of the sunlight that will be transmitted to a respective destination;
- at least two elastic pistons, the elastic pistons being coupled via a conduit for the transmittal of a predetermined working fluid, the elastic pistons being configured to receive polarized sunlight and generate electrical energy in response to the reception of the polarized sunlight, the polarized sunlight being transmitted from the polarizing beam splitter to the elastic pistons; and
- a controller, the controller being in electrical communication with the polarization modulator and the respective elastic pistons, the controller being configured to regulate compression cycles within the elastic pistons, extract electrical energy produced within the cell, and regulate and distribute the polarized sunlight from the polarizing beam splitter to the elastic pistons.

2. The system of claim 1, wherein the light collected at the concentrator is focused and transmitted to the optical window of the solar energy conversion cell.

3. The system of claim 2, wherein the light transmitted to the optical window is unpolarized light that travels through the optical window and arrives at the polarization modulator where thereafter the unpolarized light is transformed into polarized light.

4. The system of claim 3, wherein the polarized light leaves the polarization modulator and arrives at the polarizing beam splitter, the polarizing beam splitter being configured to modulate the intensity of the polarized light prior to transmitting the polarized light to at least one predetermined elastic piston.

5. The system of claim 1, wherein the controller is further configured to establish a level of polarization for the polarized light that is filtered by the polarization modulator and thereafter configure the polarization modulator to filter received light at this established level of polarization.

6. The system of claim 5, wherein the controller is further configured to control the transmission and distribution of the polarized light received at the polarizing beam splitter to a predetermined elastic piston in order to regulate the transfer of heat to the respective elastic pistons situated within the solar energy conversion cell from the polarized light transmitted by the polarizing beam splitter.

7. The system of claim 6, wherein the controller is further configured to regulate the extraction and delivery of electrical energy produced at the solar energy conversion cell in which the controller is situated to a predetermined external location.

8. The system of claim 1, wherein the controller is further configured to determine and regulate the compression cycles for the elastic pistons in order to generate acoustic waves within the working fluid.

9. The system of claim 8, wherein controllers from differing solar energy conversion cells are in electrical communication and work in concert to regulate the transfer of heat and the extraction of electrical energy from their respective solar energy conversion cell.

10. The system of claim 1, wherein the elastic pistons are comprised of a piezoelectric material.

11. The system of claim 1, wherein the elastic pistons are comprised of a magnetostrictive material.

12. A solar energy conversion cell configured for the conversion of solar energy to electrical energy, the solar energy conversion cell comprising:
- a light modulating component configured for the reception of sunlight, the light modulating component comprising:
  - an optical window through which sunlight will be transmitted;
  - a polarization modulator for the reception and modulation of the sunlight that has been transmitted through the optical window; and
  - a polarizing beam splitter, the polarizing beam splitter being configured to receive light transmitted from the polarization modulator and thereafter modulate the intensity of the sunlight that will be transmitted to a respective destination;
- at least two elastic pistons, the elastic pistons being mechanically coupled via a conduit for the transmittal of a predetermined working fluid, the elastic pistons being configured to receive polarized sunlight and generate electrical energy in response to the reception of the polarized sunlight, the polarized sunlight being transmitted from the polarizing beam splitter to the elastic pistons; and
- a controller, the controller being in electrical communication with the polarization modulator and the respective elastic pistons, the controller being configured to regulate compression cycles within the elastic pistons, extract electrical energy produced within the cell, and regulate and distribute the polarized sunlight from the polarizing beam splitter to the elastic pistons.

13. The energy conversion cell of claim 12, wherein the controller is further configured to establish a level of polarization for the polarized light that is filtered by the polarization modulator and thereafter configure the polarization modulator to filter received light at this established level of polarization.

14. The energy conversion cell of claim 13, wherein the controller is further configured to control the transmission and distribution of the polarized light received at the polarizing beam splitter to a predetermined elastic piston in order to regulate the transfer of heat to the respective elastic pistons situated within the solar energy conversion cell from the polarized light transmitted by the polarizing beam splitter.

15. The energy conversion cell of claim 14, wherein the controller is further configured to regulate the extraction and delivery of electrical energy produced at the solar energy conversion cell in which the controller is situated to a predetermined external location.

16. The energy conversion cell of claim 15, wherein the controller is further configured to determine and regulate the compression cycles for the elastic pistons in order to generate acoustic waves within the working fluid.

17. The energy conversion cell of claim 16, wherein controllers from differing solar energy conversion cells are in electrical communication and work in concert to regulate the transfer of heat and the extraction of electrical energy from their respective solar energy conversion cell.

* * * * *